(12) United States Patent
Beghini et al.

(10) Patent No.: US 9,161,386 B1
(45) Date of Patent: Oct. 13, 2015

(54) HYBRID LMR TRANSCEIVER WITH LTE AND DYNAMIC ANTENNA CONTROL

(71) Applicant: HARRIS CORPORATION, Melbourne, FL (US)

(72) Inventors: Kenneth Beghini, Hilton, NY (US); Donald R. Martz, Webster, NY (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 14/459,353

(22) Filed: Aug. 14, 2014

(51) Int. Cl.
*H04M 1/00* (2006.01)
*H04W 88/06* (2009.01)
*H04W 72/04* (2009.01)

(52) U.S. Cl.
CPC .......... *H04W 88/06* (2013.01); *H04W 72/0453* (2013.01)

(58) Field of Classification Search
CPC ........................ H04W 88/06; H04W 72/0453
USPC ........ 455/552.1, 434, 518, 452.2, 404.1, 423; 370/241, 312, 328, 350, 392, 401, 252
See application file for complete search history.

(56) References Cited

U.S. PATENT DOCUMENTS

2006/0262800 A1* 11/2006 Martinez et al. .......... 370/395.52
2015/0065186 A1* 3/2015 Mohd Mohdi et al. ....... 455/518
2015/0180514 A1* 6/2015 Pavacic et al. ............. 455/552.1

* cited by examiner

*Primary Examiner* — Dhaval Patel
(74) *Attorney, Agent, or Firm* — Robert J. Sacco, Esq.; Fox Rothschild LLP (57) ABSTRACT

LMR and LTE transceivers are disposed within a portable radio housing. The LTE transceiver is configured to utilize two separate antennas. An embedded antenna disposed within the portable radio housing is coupled to the LTE transceiver. An RF signal routing network provided in the portable radio housing is coupled to the LMR transceiver, the LTE transceiver, and an external antenna. A control system controls the RF signal routing network to selectively connect at least one the LMR transceiver or the LTE transceiver to the external antenna in accordance with at least one operating condition.

18 Claims, 7 Drawing Sheets

HYBRID LMR TRANSCEIVER WITH LTE AND DYNAMIC ANTENNA CONTROL

BACKGROUND OF THE INVENTION

1. Statement of the Technical Field

The inventive arrangements relate to land mobile radio (LMR) equipment, and more particularly to LMR equipment with improved integration of secondary communications capabilities.

2. Description of the Related Art

The land mobile radio service (LMRS or LMR) is a regulated system for radio communications between land-based mobile and fixed stations. The service is commonly utilized by emergency first responder organizations, public works organizations and other organizations with numerous mobile field staff. In a conventional LMR system, a base station or repeater transmits and receives signals from a number of mobile or portable radio units, which are sometimes called subscriber units. In a conventional LMR trunked radio system, a relatively small number of radio channels are commonly used to facilitate voice and data communications between the base station and many LMR subscriber radios. LMR is primarily designed to meet the critical narrowband voice communications needs of first responders and others.

Long-Term Evolution (or LTE as it is commonly known), is a telecommunication standard for wireless communication. More particularly, the LTE standard is a cellular radio technology which represents an evolution of the cellular GSM/UMTS standards. LTE was designed to increase the capacity and data speeds of commercial wireless data networks and is commonly used in many commercial smart phones for communicating broadband data and video.

SUMMARY OF THE INVENTION

Embodiments of the invention concern a hybrid land mobile radio disposed in a portable radio housing. An LMR transceiver is disposed in the portable radio housing, which facilitates communications using an LMR communications protocol on one or more LMR frequency bands. An LTE transceiver is also disposed within the portable radio housing. The LTE transceiver facilitates LTE communications using an LTE communications protocol on one more LTE frequency bands. The LTE transceiver is configured to utilize two separate antennas. At least a first embedded antenna is disposed within the portable radio housing and coupled to the LTE transceiver. An external antenna is disposed on an external portion of the portable radio housing. An RF signal routing network is provided in the portable radio housing. The RF signal routing network is coupled to the LMR transceiver, the LTE transceiver, and the external antenna. A control system controls the RF signal routing network to selectively connect at least one the LMR transceiver or the LTE transceiver to the external antenna in accordance with at least one operating condition.

According to another aspect, the hybrid land mobile radio includes a second embedded antenna disposed within the portable radio housing. In such an embodiment, the RF signal routing network is coupled to the LMR transceiver, the LTE transceiver, the second embedded antenna and the external antenna port. The control system controls the RF signal routing network to selectively connect the LMR transceiver exclusively to one of the external antenna port and the second embedded antenna. Concurrently, the control system controls the RF signal routing network to connect the LTE transceiver to one of the external antenna port and the second antenna. The antenna connection selections are made in accordance with at least one operating condition.

According to another aspect, the invention concerns a method for operating a hybrid land mobile radio. The method includes establishing an LMR communication link using an LMR transceiver disposed in a portable radio housing. The LMR communication link is implemented using an LMR communications protocol on one or more LMR frequency bands. In the same hybrid land mobile radio, two or more separate antennas are used to establish an LTE communication link using an LTE transceiver. The LTE communication link is implemented using an LTE communication protocol on one more LTE frequency bands. At least one of the separate antennas used for LTE is a first embedded antenna disposed within the portable radio housing. An RF signal routing network is used to selectively couple at least one the LMR transceiver and the LTE transceiver to an external antenna port of the portable radio housing in accordance with at least one operating condition.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

A portable or mobile radio used in connection with LMR communications is sometimes referred to herein as a land mobile radio or as an LMR subscriber unit. The inclusion of an LTE communication capability in an LMR subscriber unit would provide a significant advantage to an LMR user. In particular, the inclusion of an LTE capability in an LMR subscriber unit could advantageously facilitate the availability of broadband voice and video data for an LMR user while maintaining all of the advantages of an independent LMR radio system. But the addition of LTE communication capability to an LMR radio presents its own set of design challenges. LMR radios are designed to be compact and rugged. They also need powerful batteries to facilitate long hours of operation. In order to meet all of these design goals, available space within an LMR radio must be utilized with care. Moreover, the addition of LTE to an LMR subscriber radio must not degrade the performance of the LMR subscriber with respect to LMR communications. Accordingly, the inventive arrangements provide an LMR subscriber unit with LTE in which the available hardware resources in the subscriber unit can be used redundantly to maintain a compact form of an LMR radio. The inventive arrangements further provide a means by which an LTE transceiver in an LMR radio can be provided with at least one antenna that is physically of a relatively large size so as to enhance LTE performance. According to another aspect, the inventive arrangements can provide a back-up or alternative to an external antenna for certain types of LMR communications. These and other advantages of the inventive arrangements will become apparent as the discussion progresses.

Figure 1:
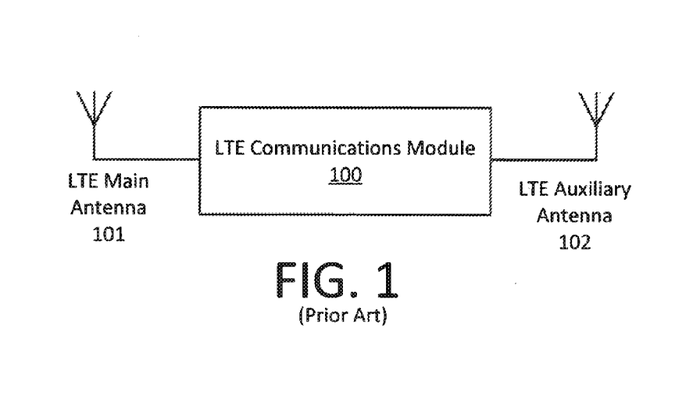
FIG. 1 is a drawing that is useful for understanding an LTE communication module which includes an LTE main antenna and an LTE auxiliary antenna.

In North America, LTE communications frequencies can include 700, 850, 1900, 1700/2100 (AWS) and 2600 MHz. The LTE standard calls for the use of two separate antenna structures for the multiple transmitting and receiving of signals. The two antennas are used for achieving diversity gain to improve the reliability of the communication link. In FIG. 1 there is shown a block diagram of a conventional LTE communications module 100 which includes an LTE transceiver (not shown). For example, the LTE communication module can be provided in the form of a PCI Express Mini Card (PEM). An LTE PEM is an embedded module that can be integrated in other devices to facilitate implementation type of LTE data communications. As shown in FIG. 1, the LTE communications module can employ multiple input, multiple output (MIMO) radios which are configured to operate using two antennas including an LTE main antenna 101 and an LTE auxiliary antenna 102. LTE communication modules using two or more transmit/receive chains are known in the art and therefore will not be described here in detail. However, it may be noted that multiple LTE antennas are often disposed internal to the chassis of an LTE enabled device so as to facilitate a compact design.

Figure 2:
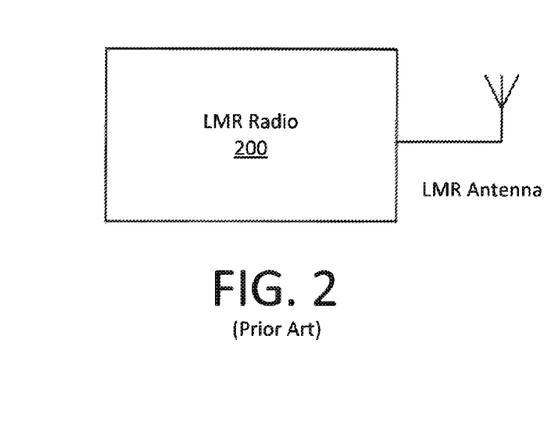
FIG. 2 is s a drawing that is useful for understanding an LMR radio which utilizes a single antenna for LMR communications.

LMR frequencies include a VHF band (136 MHz to 174 MHz), UHF bands (which extend from 380 MHz to 520 MHz), a 700/800 MHz band. FIG. 2 shows that a conventional LMR subscriber unit will frequently include a single external antenna. In some instances the single antenna may be designed to facilitate communications on two or more of the LMR frequency bands. Still, a conventional LMR subscriber unit which includes LTE will naturally contain multiple antennas as it requires at least two for LTE and at least one for LMR.

Figure 3:
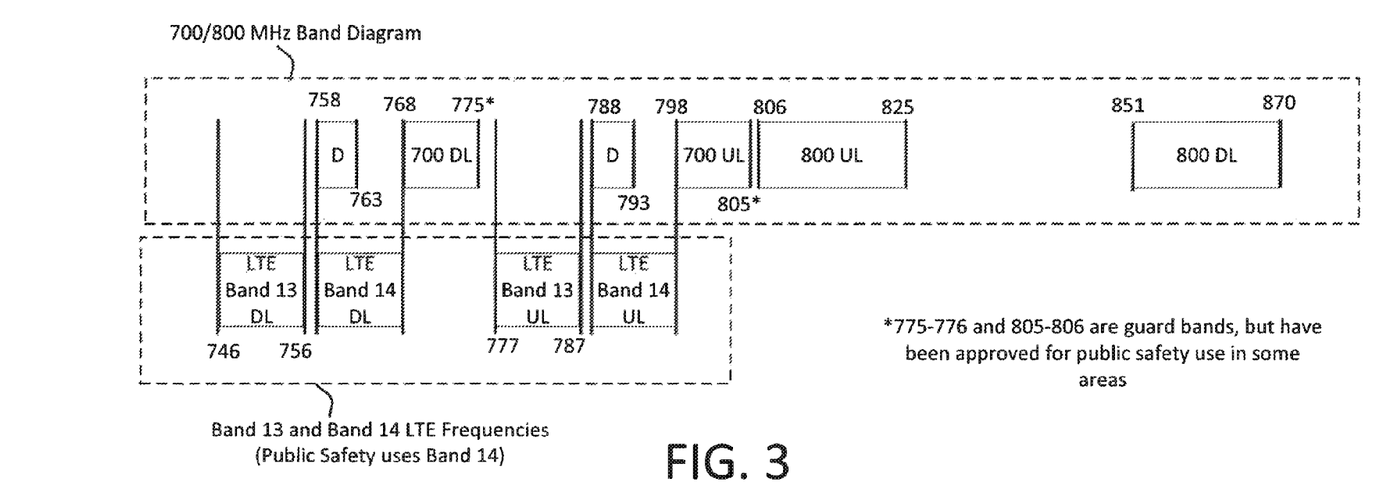
FIG. 3 is a drawing that is useful for comparing a frequency plan for a 700/800 MHz LMR band to a frequency plan for plurality of LTE bands, including LTE band 13 and 14.

Referring now to FIG. 3, there is shown a frequency spectrum allocation chart which shows the 700/800 MHz LMR frequency bands including a downlink allocation in the 700 MHz band (700 UL) from 768 MHz to 775 MHz, an uplink allocation in the 700 MHz band (700 UL) from 798 MHz to 806 MHz. Similar allocations are shown in the 800 MHz band including an 800 MHz band uplink (800 UL) from 806 MHz to 825 MHz, and an 800 MHz band downlink (800 DL) from 851 MHz to 870 MHz. Further allocations are provided for certain data transmissions from 758 MHz to 763 MHz and from 788 MHz to 793 Mhz. Also shown in FIG. 3 are the frequency allocations for LTE Band 13 and LTE band 14. These include LTE band 13 down-link (LTE band 13 DL) from 746-756 MHz and LTE band 13 up-link (LTE band 13 UL) from 777-787 MHz. For LTE Band 14 there is provided LTE band 14 down-link (LTE band 14 DL) from 758-768 MHz, and LTE band 14 up-link (LTE band 14 UL) from 788-798 MHz.

It can be observed from FIG. 3 that the frequency allocations for LTE bands 13 and 14 are adjacent to or overlap the frequency allocations in the 700 MHz LMR band. Notably, a common antenna can be designed to cover all of these frequencies. Accordingly, if an LMR subscriber unit is designed to include an LTE communication module 100 which operates on LTE bands 13 and/or 14, then such hybrid LMR subscriber unit can facilitate sharing of an external LMR antenna for both LMR and LTE usage under certain conditions. The LTE communication module 100 will still require use of two antennas for diversity per LTE standards; but if the main LMR antenna is properly designed, it can serve as the second antenna for purposes of the LTE communication module. As such, the need for three separate antennas can be avoided. Alternatively, if two dedicated LTE antennas are included internally within the LMR subscriber unit, then the second LTE antenna can serve as a back-up or alternative antenna for LMR operations. The LMR subscriber unit could then automatically select (main external antenna or internal LTE antenna) which yields best performance under a particular operating condition. Finally, under certain conditions, the second LTE antenna can serve as an alternative antenna or as a back-up antenna for LMR communications in the event that no external LMR antenna is available.

Figure 4:
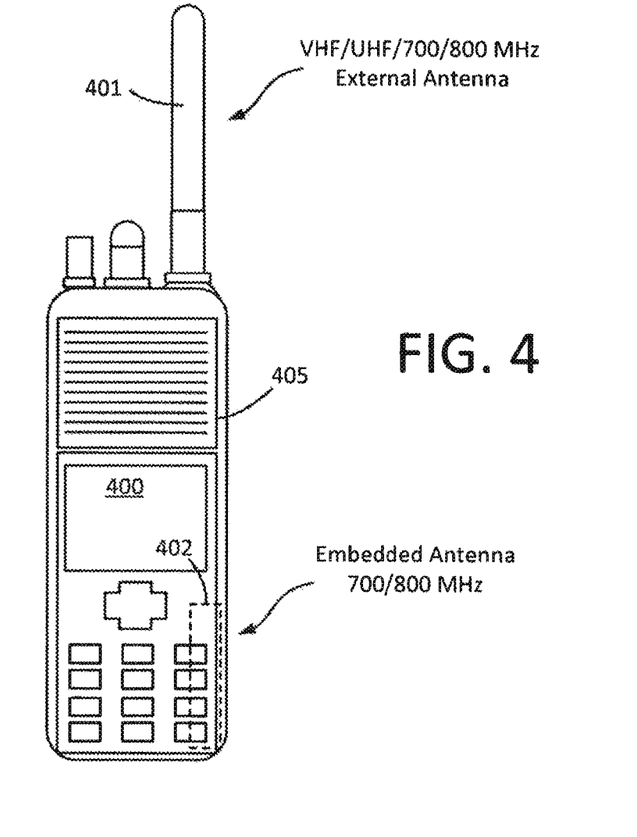
FIG. 4 is a drawing which shows a hybrid LMR subscriber unit with an external antenna and an embedded antenna, which is useful for understanding the inventive arrangements.

Referring now to FIG. 4, there is shown an LMR subscriber unit 400. An LMR external antenna 401 is disposed on an external part of a portable radio housing 405. The external antenna can be designed to facilitate LMR communications on one or more LMR frequency bands. For example, the LMR external antenna can be designed to facilitate receive and transmit capability on LMR bands including the VHF, UHF, 700 MHz, and 800 MHz bands. In an embodiment of the invention, the external antenna can be a monopole type antenna, but other external antenna designs are also possible. An internal or embedded LTE antenna 402 is provided inside the portable radio housing 405. The embedded LTE antenna 402 advantageously facilitates LTE transceiver operations for LTE band 13 and band 14. Due to the adjacent and/or overlapping nature of the frequency allocations, the LMR external antenna 401 can be designed or tuned to facilitate receive and transmit capability on LTE band 13 and/or LTE band 14.

Figure 5:
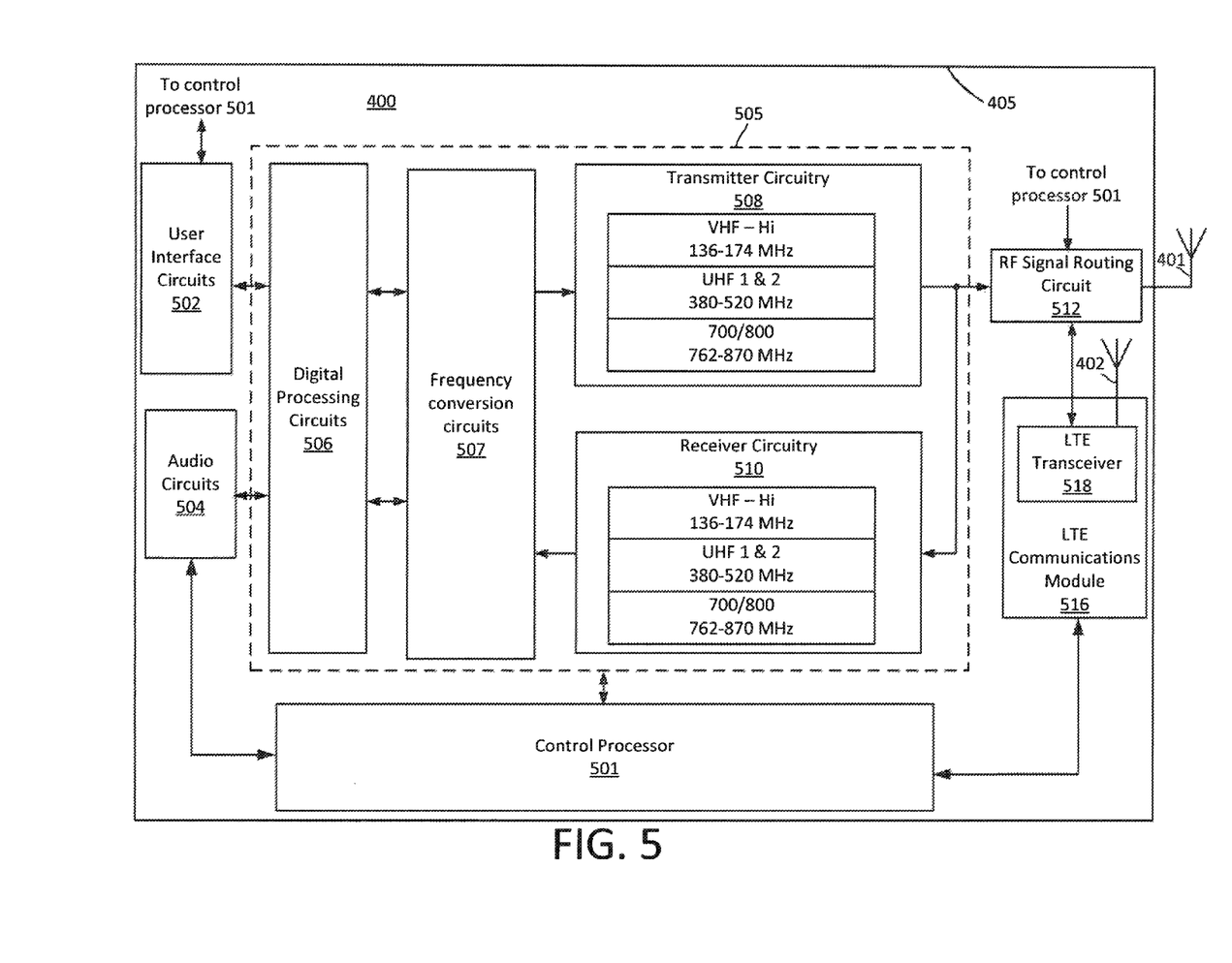
FIG. 5 is a block diagram which is useful for understanding a system architecture of the LMR subscriber unit in FIG. 4.

Referring now to FIG. 5, there is shown an exemplary block diagram of the LMR subscriber unit 400. As illustrated therein, the LMR subscriber unit includes an LMR transceiver 505 which is disposed within the portable radio housing 405. The LMR transceiver 505 includes transmitter circuitry 508 and receiver circuitry 510. In this example, the transmitter and receiver circuitry is designed to facilitate RF communications on LMR bands which include the LMR VHF band (136-174 MHz), the LMR UHF 1 and UHF 2 band which are collectively referred to herein as the LMR UHF band (380-520 MHz), and the LMR 700/800 MHz band (762-870 Mhz). Accordingly, an external LMR antenna 401 can be provided that is designed for operation over each of these frequency ranges. Of course, the invention is not limited to the particular set of frequency ranges described herein and in some embodiments more or fewer frequency bands can be accommodated by the LMR subscriber unit 400 and the antenna 401. But for purposes of the inventive arrangements it shall be assumed that LMR 400 and antenna 401 are capable of functioning on at least the 700/800 MHz LMR band. In a preferred embodiment, the LMR external antenna is designed for operations on two or more of the LMR frequency bands.

Also disposed within the portable radio housing 405 are frequency conversion circuits 507, digital processing circuits 506, user interface circuits 502, audio circuits 504, and a control processor 501. Frequency conversion circuits 507 can include suitable RF synthesizers and mixer circuits to facilitate up-conversion of baseband signals to RF signals, and down-conversion of RF signals to baseband signals. Digital processing circuits 506 include A/D and D/A circuits and digital signal procession (DSP) circuits to perform certain signal processing operations on baseband signals. User interface circuits 502 include circuits which support user inputs and display functions. Audio circuits 504 are provided to facilitate audio input and output from the LMR subscriber unit. Analog and digital circuits capable of carrying out all of the foregoing functions are well known in the art and therefore will not be described here in detail.

The LMR subscriber unit 400 includes an LTE communications module 516. The LTE communication module can be implemented as an LTE PEM, but the invention is not limited in this regard. Any suitable LTE communication module can be used for purposes of the inventive arrangements as described herein. The LTE communications module 516 includes an LTE transceiver 518, which is advantageously selected to operate on one or more LTE communications bands. For example, the LTE transceiver can be designed to provide LTE communications on one or both of LTE band 13 and LTE band 14. For purposes of maximizing data transfer rates, the LTE transceiver can employ multiple input, multiple output (MIMO) radios which are configured to operate using two (or more) transmit/receive chains. As such, two antennas are shown in the exemplary embodiment to support two LTE transmit/receive chains. An LTE communications module as shown is well known in the art and therefore will not be described in detail. However, it will be noted that the LTE communications module will require the use of two antennas. One such antenna can be provided as LTE embedded antenna 402 which id disposed internal of the portable radio housing. Any suitable embedded antenna can be used for this purpose, provided that it is capable of facilitating LTE communications on the LTE bands. The second required LTE antenna is advantageously implemented using the external LMR antenna 401. RF signal routing circuits 512 allow the external LMR antenna 401 to be used by the LMR subscriber unit for LMR communications and/or for LTE communications. The control processor 501 is provided for controlling the operation of all the various components comprising the LMR subscriber unit 400. The control processor can be any suitable micro-controller or a microprocessor.

Figure 6:
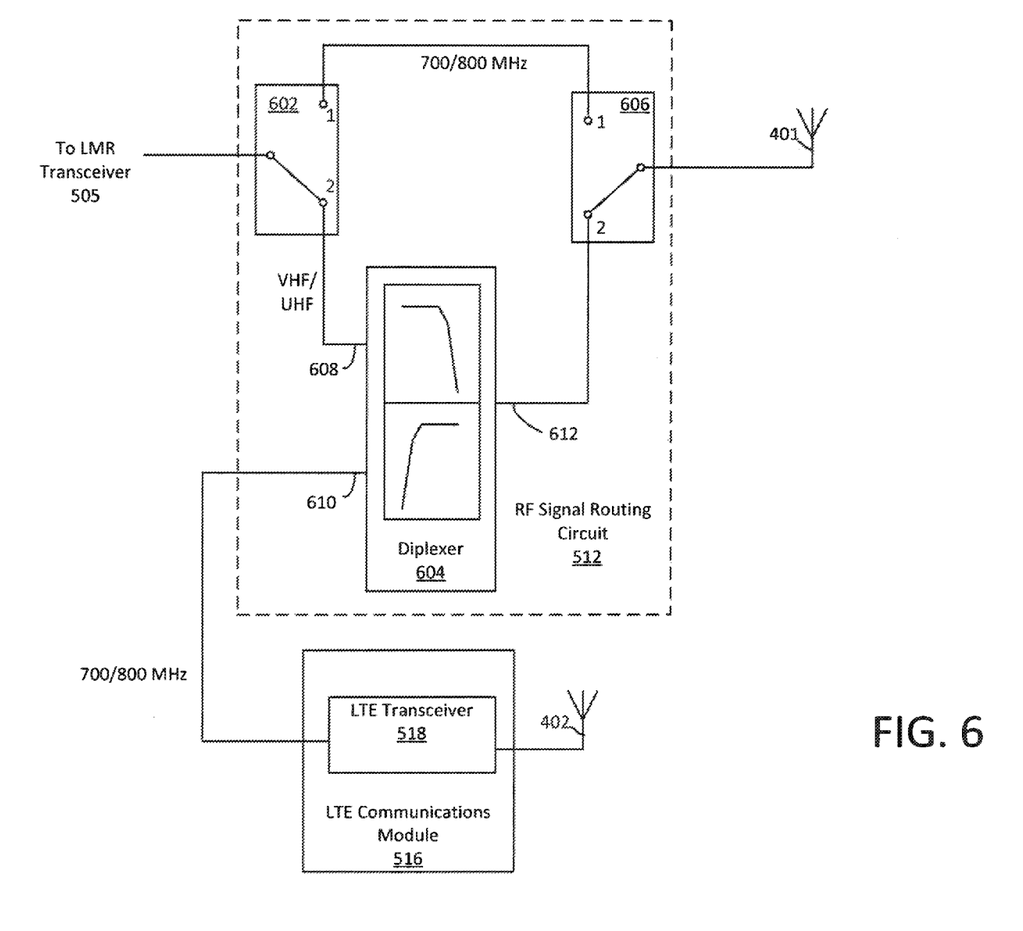
FIG. 6 is a block diagram which is useful for understanding an exemplary RF signal routing circuit used in the LMR subscriber unit of FIG. 5.

Referring now to FIG. 6 there is provided an exemplary arrangement of an RF signal routing circuit 512. The RF signal routing circuit 512 includes RF switches 602, 606 and diplexer 604. When the LMR is operating in either the VHF or UHF LMR bands, the RF switches 602 and 606 can each be set in position 2 as shown so that LMR VHF/UHF signals from LMR transceiver 505 are coupled to the external LMR antenna 401 through a low-frequency port 608 of diplexer 604. With the foregoing arrangement, LMR frequencies in the VHF/UHF bands are routed between low frequency port 608 and a common antenna port 612. Due to the design of the diplexer, any LMR signals in the VHF/UHF bands that are input to the diplexer at ports 608 or 612 are highly attenuated at the high-frequency port 610. Accordingly, the VHF/UHF signals associated with LMR communications do not interfere with operations of the LTE transceiver 518. Similarly, received and transmitted LTE signals in the 700/800 MHz band are routed between high-frequency port 610 and the common antenna port 612. Due to the design of the diplexer, any LTE signals in the LTE band 13 or band 14 (700 Mhz band) are highly attenuated at the low frequency port 608. Accordingly, the LTE transceiver 518 can use the external LMR antenna 401 as its primary LTE antenna and will use the embedded antenna 402 as its auxiliary antenna. The external antenna 401 will generally improve LTE performance since the antenna is external of the chassis and can be of a larger physical size as compared to an internal or embedded LTE antenna. With the foregoing arrangement, LMR communications with LMR transceiver 505 on LMR VHF or UHF bands can occur concurrently with the LTE communications on the external antenna 401 because shared usage of the external antenna 401 is facilitated by means of the diplexer 604.

When conditions require LMR communications on the 700/800 MHz band, the switches 602, 606 can both be placed in position 1. In this switch configuration, the external antenna 401 is coupled only to LMR transceiver 505 (for LMR communications). This switch configuration protects the LTE transceiver 518 from high power RF signals output from transmitter circuitry 508 during transmissions on the LMR 700/800 MHz bands. In particular, the LTE transceiver 518 is isolated from antenna 401 during LMR 700/800 MHz transmissions so as to prevent relatively high power transmitter signals (i.e., from transmitter circuitry 508) from being communicated to the LTE transceiver 518. In this condition, the LTE transceiver 518 uses only the embedded antenna 402 for LTE communications or is temporarily disabled. Alternatively, a second embedded LTE antenna can be provided as described below in relation to FIGS. 7-10.

Figure 7:
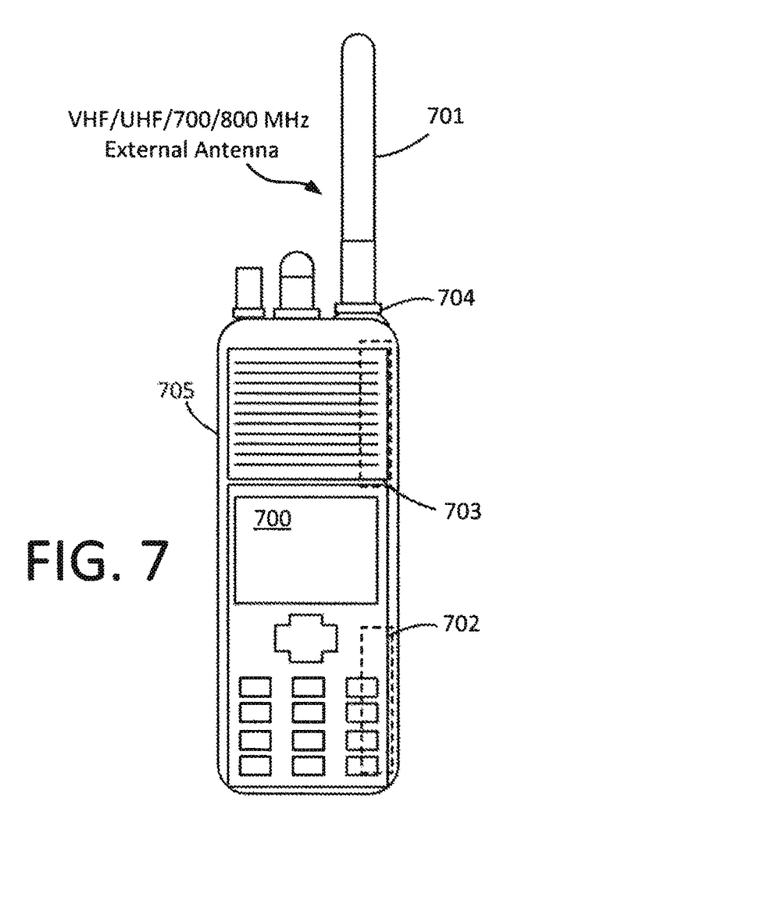
FIG. 7 is a drawing which shows a hybrid LMR subscriber unit with an external antenna and two embedded antennas, which is useful for understanding an alternative embodiment of the inventive arrangements.
Figure 8:
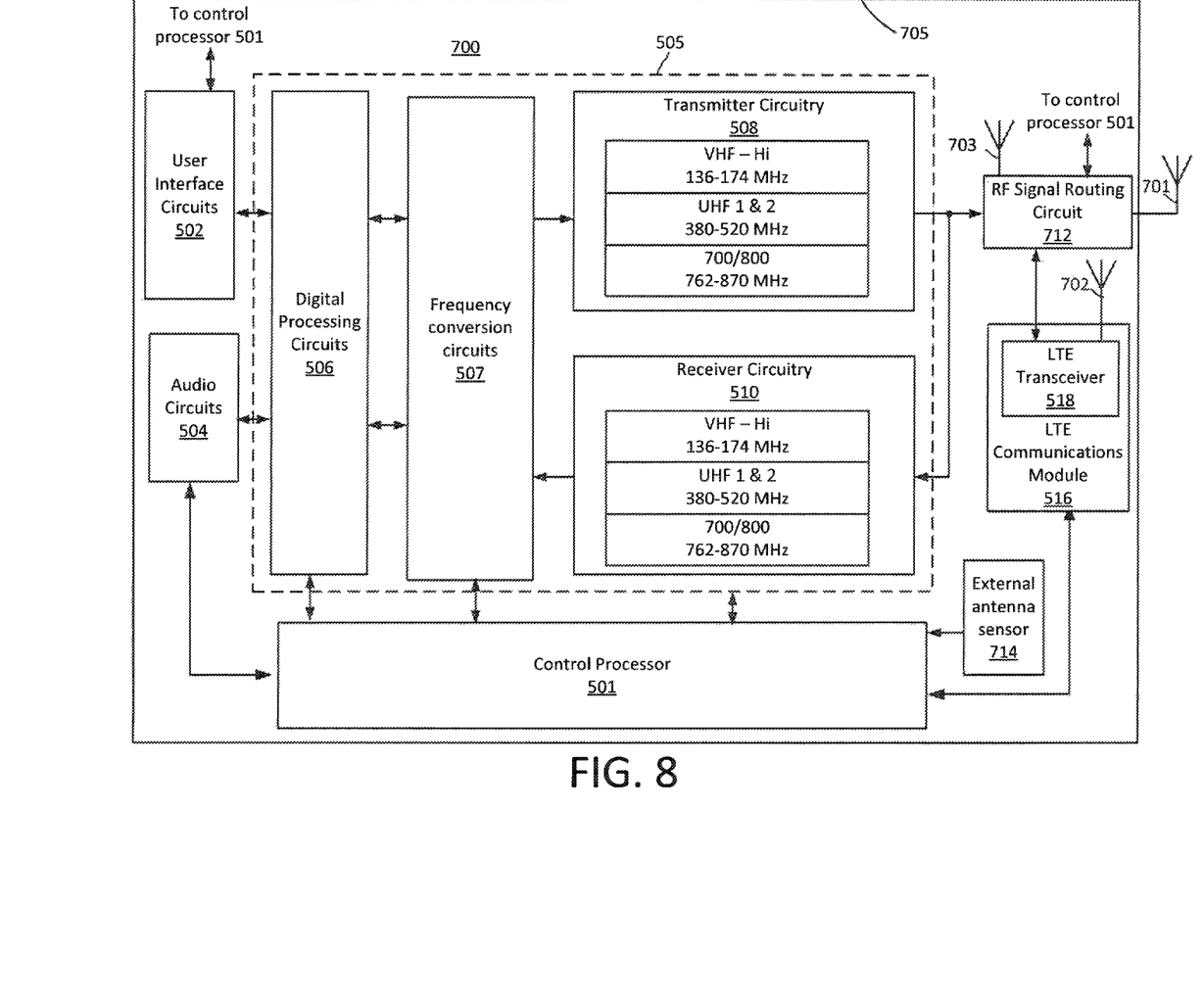
FIG. 8 is a block diagram which is useful for understanding a system architecture of the LMR subscriber unit in FIG. 7.

As shown in FIGS. 7 and 8, an LMR subscriber unit 700 can include a portable radio housing 705 including two embedded antennas 702, 703 for communications on the 700/800 Mhz band. The embedded antennas are disposed internal of the portable radio housing. The LMR subscriber unit 700 is similar to LMR subscriber unit 400 and like components in LMR subscriber unit 700 are identified with the same reference numbers. Notably, LMR subscriber unit includes RF switching circuitry 712 and the additional embedded antenna 703 which is spatially separated relative to embedded antenna 702. LMR subscriber unit 700 can also include an external antenna sensor 714 in certain embodiments as hereinafter described. The external antenna sensor can detect the presence or absence of an antenna connected to an external antenna port disposed on the housing 705.

As explained below the external antenna 701 is optional in this embodiment. If the external antenna 701 is included, the two embedded antennas 702, 703 can be used for LTE communications and the external antenna can be used for LMR communications. In certain communication scenarios, the external antenna 701 can also be used to improve LTE performance in a manner similar to that described above with respect to FIG. 6. RF signal routing circuitry 712 is provided to selectively facilitate use of the external antenna by the LTE transceiver 518. As explained below, the RF signal routing circuitry 712 can be configured to also selectively facilitate use of the embedded antenna 703 by the LMR transceiver 505.

For example, a received LTE signal in the 700 MHz band can be of very low signal strength when received on embedded antennas 702, 703. In such a scenario, the LMR subscriber unit can automatically selectively switch antennas to instead receive the LTE signal on the external antenna 701 and embedded antenna 702. Conversely, if a high power LMR signal is received on external antenna 701 on the 700/800 MHz band, and such signal exceeds the maximum input capability of the receiver circuitry, then the LMR subscriber unit can automatically switch antennas to utilize the embedded antenna 703 instead of external antenna 701. The embedded antenna will usually have lower gain as compared to the external antenna and will reduce the magnitude of the received LMR signal. Similarly, a lower powered interfering signal on the LMR 700/800 MHz band can interfere with a higher powered LMR signal under certain conditions. Accordingly, the lower powered signal can be attenuated or reduced below a noise floor of an LMR receiver by using the embedded antenna 703 in place of the external antenna. The interfering signal is attenuated because the embedded antenna 703 is likely to have lower gain as compared to the external antenna. The transition as between the embedded antenna and external antenna can be based on an RSSI of a received signal, or any other appropriate signal metric.

The LMR subscriber unit 700 can also be configured so that if the external antenna 701 is absent (or present but nonfunctional), then the unit will automatically instead use embedded antenna 703 for LMR communications in the 700/800 MHz range. The presence or absence of the antenna 701 at external antenna port 704 can be detected by any suitable means. For example, the presence or absence of the external antenna 701 can be detected by means of an external antenna sensor 714. The external antenna sensor can be a simple pressure switch disposed at antenna port 704. Alternatively, the external antenna sensor can be a circuit for measuring a voltage standing wave ratio (VSWR) at the antenna port. If the antenna is absent of non-functional, the antenna sensor will detect an unusually high VSWR at the external antenna port 704. If conditions are such that the external antenna is absent, not functioning properly, or not suitable for current communication conditions, the LMR subscriber unit will automatically select the embedded antenna 703 for LMR communications on the 700/800 MHz band.

Figure 9:
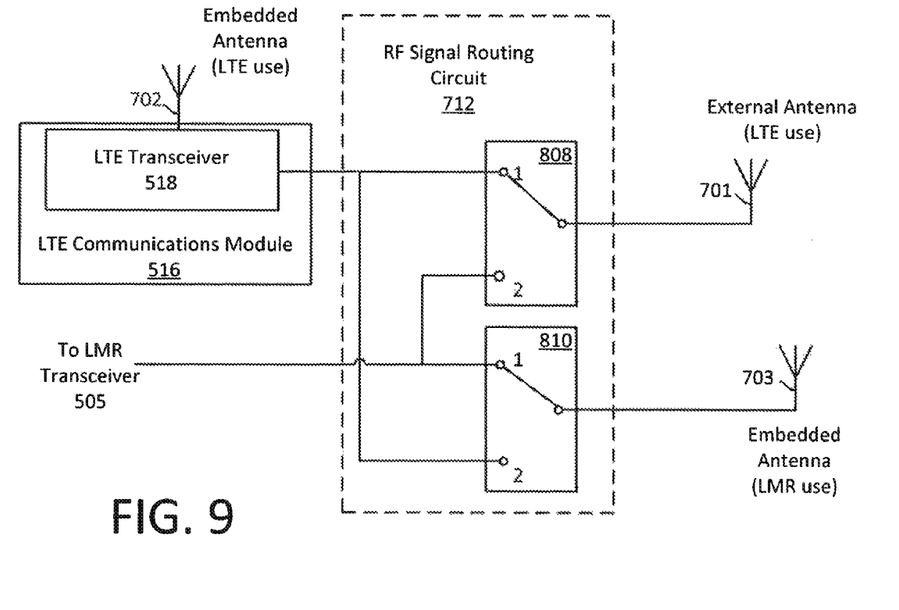
FIG. 9 is a block diagram that is useful for understanding an exemplary RF signal routing circuit in a first switch configuration used in the LMR subscriber unit of FIG. 8.
Figure 10:
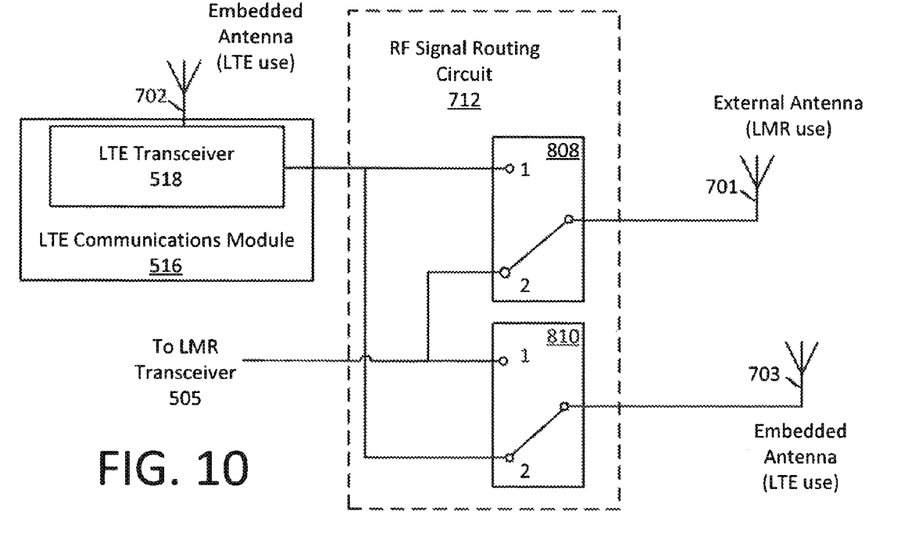
FIG. 10 is a block diagram that is useful for understanding the operation of the exemplary RF signal routing circuit in FIG. 9 in a second switch configuration.

Referring now to FIG. 9 there is shown an exemplary RF signal routing circuit 712 in a first exemplary switching configuration. In this switch configuration switch 808 and 810 are each in position 1 such that the LTE transceiver 518 is connected to external antenna 701, and the LMR transceiver is connected to embedded antenna 703. Such a switching configuration may be advantageous in a scenario where an LMR communication link can provide satisfactory performance using the embedded antenna 703, but LTE signals are relatively weak (requiring use of the higher gain external antenna 701 for LTE communications). Conversely, FIG. 10 shows a switch configuration in which the LTE transceiver 518 is connected to embedded antenna 703 and the LMR transceiver 505 is connected to external antenna 701. Such a switching configuration might be used, for example, when the LMR subscriber unit 700 is nearby an LTE base station site and achieves a satisfactory communication link using the embedded antennas 702, 703, but wherein the LMR communication link requires the additional gain offered by the external antenna 701. Those skilled in the art will appreciate that other RF signal routing circuits are possible and the switching configurations shown are merely two possible examples. The invention is therefore not limited to the particular switching and/or signal routing circuits that are shown.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

We claim:

1. A hybrid land mobile radio, comprising:
a portable radio housing;
an LMR transceiver, disposed in the portable radio housing, which facilitates communications using an LMR communications protocol on one or more LMR frequency bands;
an LTE transceiver, disposed within the portable radio housing, which facilitates LTE communications using an LTE communications protocol on one more LTE frequency bands, the LTE transceiver configured to concurrently utilize a first and a second diversity antenna for achieving diversity gain during LTE communication operations;
an external antenna disposed on an external portion of the portable radio housing
at least a first embedded antenna which serves as the first diversity antenna disposed within the portable radio housing and coupled to the LTE transceiver;
an RF signal routing network coupled to the LMR transceiver, the LTE transceiver, and the external antenna; and
a control system which controls the RF signal routing network to selectively connect at least one of the LMR transceiver and the LTE transceiver to the external antenna in accordance with at least one operating condition to facilitate use of the external antenna by the LTE transceiver as the second diversity antenna; and
wherein the external antenna is configured to facilitate LMR communications on the 700/800 MHz LMR frequency band, and the LTE transceiver communicates on at least one of LTE band 13 and LTE band 14.

2. The hybrid land mobile radio according to claim 1, wherein the LMR frequency bands on which the LMR transceiver communicates further include one or more selected from the group consisting of an LMR VHF band, and an LMR UHF band.

3. The hybrid land mobile radio according to claim 1, wherein the control system is arranged to determine said operating condition based on at least one communication link metric which specifies a quality of a communication link implemented by at least one of said LMR transceiver and the LTE transceiver.

4. The hybrid land mobile radio according to claim 1, wherein the control system determines the operating condition based on a particular LMR frequency band which is selected for implementing a communication when using said LMR transceiver.

5. The hybrid land mobile radio according to claim 1, wherein the external antenna is a multi-band antenna designed to facilitate communications on the 700/800 MHz band, on LTE band 13 and LTE band 14.

6. The hybrid land mobile radio according to claim 1, further comprising a second embedded antenna disposed within the portable radio housing and coupled to the RF signal routing network, wherein the RF signal routing network selectively connects the second embedded antenna to the LTE transceiver for use as the second diversity antenna, in place of the external antenna, under a second predetermined operating condition.

7. A hybrid land mobile radio, comprising:
a portable radio housing;
an LMR transceiver, disposed in the portable radio housing, which facilitates communications using an LMR communications protocol on one or more LMR frequency bands;
an LTE transceiver, disposed within the portable radio housing, which facilitates LTE communications using an LTE communications protocol on one more LTE frequency bands, the LTE transceiver configured to utilize two separate antennas;
an external antenna disposed on an external portion of the portable radio housing
a first embedded antenna disposed within the portable radio housing and coupled to the LTE transceiver;
an RF signal routing network coupled to the LMR transceiver, the LTE transceiver, and the external antenna;
a second embedded antenna disposed within the portable radio housing and coupled to the RF signal routing network and
a control system which controls the RF signal routing network to selectively connect at least one of the LMR transceiver and the LTE transceiver to the external antenna in accordance with at least one operating condition and to selectively connect one of the LMR transceiver and the LTE transceiver to the second embedded antenna in accordance with said at least one operating condition.

8. The hybrid land mobile radio according to claim 7, wherein the operating condition is determined based on a voltage standing wave ratio.

9. The hybrid land mobile radio according to claim 7, wherein the operating condition is based on at least one sensor which detects a presence of the external antenna.

10. A hybrid land mobile radio, comprising:
a portable radio housing;
an LMR transceiver, disposed in the portable radio housing, which facilitates communications using an LMR communications protocol on one or more LMR frequency bands;
an LTE transceiver, disposed within the portable radio housing, which facilitates LTE communications using an LTE communications protocol on one more LTE frequency bands, the LTE transceiver configured to utilize two separate antennas;
an external antenna port disposed on an external portion of the portable radio housing
a first embedded antenna disposed within the portable radio housing and coupled to the LTE transceiver;
a second embedded antenna disposed within the portable radio housing;
an RF signal routing network coupled to the LMR transceiver, the LTE transceiver, the second embedded antenna and the external antenna port; and
a control system which controls the RF signal routing network to selectively connect the LMR transceiver exclusively to one of the external antenna port and the second embedded antenna, and concurrently connect the LTE transceiver to one of the external antenna port and the second antenna, in accordance with at least one operating condition.

11. The hybrid land mobile radio according to claim 10, wherein the LMR transceiver communicates on the 700/800 MHz LMR frequency band, and the LTE transceiver communicates on at least one of LTE band 13 and LTE band 14.

12. The hybrid land mobile radio according to claim 11, wherein the LMR frequency bands on which the LMR transceiver communicates further include one or more selected from the group consisting of an LMR VHF band, and an LMR UHF band.

13. The hybrid land mobile radio according to claim 10, wherein the control system is arranged to determine said operating condition based on at least one communication link metric which specifies a quality of a communication link implemented by at least one of said LMR transceiver and the LTE transceiver.

14. The hybrid land mobile radio according to claim 10, wherein the control system determines the operating condition based on a particular LMR frequency band which is selected for implementing a communication when using said LMR transceiver.

15. The hybrid land mobile radio according to claim 10, wherein the external antenna is designed to facilitate communications on the LMR 700/800 MHz band, and at least one of LTE band 13 and LTE band 14.

16. A method for operating a hybrid land mobile radio, comprising:
establishing an LMR communication link using an LMR transceiver disposed in a portable radio housing, the LMR communication link implemented using an LMR communications protocol on one or more LMR frequency bands;
concurrently using a first and second diversity antenna to achieve diversity gain when communicating over an LTE communication link using an LTE transceiver disposed in the portable radio housing, the LTE communication link implemented using an LTE communication protocol on one more LTE frequency bands;
selecting as the first diversity antenna a first embedded antenna disposed within the portable radio housing;
using an RF signal routing network to selectively couple at least one of the LMR transceiver and the LTE transceiver to an external antenna port of the portable radio housing in accordance with at least one operating condition, the external antenna port coupled to an external antenna to facilitate selective use of the external antenna by the LTE transceiver as the second diversity antenna in accordance with the operating condition; and
wherein the external antenna is operable to facilitate LMR communication on the 700/800 MHz LMR frequency band, and the LTE transceiver communicates on at least one of LTE band 13 and LTE band 14.

17. The method according to claim 16, further comprising concurrently connecting both the LMR transceiver and the LTE transceiver to the external antenna port using the RF signal routing network.

18. A method for operating a hybrid land mobile radio, comprising:
establishing an LMR communication link using an LMR transceiver disposed in a portable radio housing, the LMR communication link implemented using an LMR communications protocol on one or more LMR frequency bands;

using two or more separate antennas to establish an LTE communication link using an LTE transceiver disposed in the portable radio housing, the LTE communication link implemented using an LTE communication protocol on one more LTE frequency bands;

selecting at least one of the separate antennas to include a first embedded antenna disposed within the portable radio housing;

using an RF signal routing network to selectively couple at least one the LMR transceiver and the LTE transceiver to an external antenna port of the portable radio housing in accordance with at least one operating condition; and using the RF signal routing network to selectively connect one of the LMR transceiver and the LTE transceiver to a second embedded antenna in the portable radio housing in accordance with said at least one operating condition.

* * * * *